Patented Oct. 12, 1948

2,451,082

UNITED STATES PATENT OFFICE 2,451,082

PURIFICATION OF PHENOTHIAZINE

Charles W. Gates and Cecil R. Howey, Elmira, Ontario, Canada, assignors to United States Rubber Company, New York, N. Y., a corporation of New Jersey No Drawing. Application September 5, 1946, Serial No. 695,032

5 Claims. (Cl. 260—243)

This invention relates to a method of purifying thiodiarylamines, and specifically phenothiazine.

Phenothiazine is a crystalline yellow compound having the structural formula

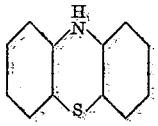

and melting when pure at 185.1° C. It is used extensively as an anthelmintic agent to control intestinal worms in animals. For such a use it must be purified. It is an object of this invention to provide a means whereby phenothiazine may be conveniently and readily purified.

Phenothiazine is prepared from diphenylamine and sulfur in the presence of acidic catalysts, such as iodine, aluminum chloride, antimony trichloride, sulfur chloride, ferric chloride, etc. according to the equation

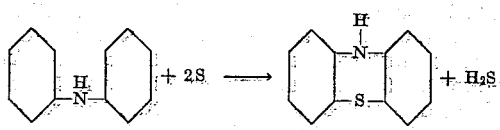

The crude product is a gray to black, foul smelling material containing as impurities sulfur, catalyst, and oxidized or halogenated derivatives of diphenylamine of unknown constitution; it may also contain some unreacted diphenylamine.

We have discovered that the crude phenothiazine can be purified by treatment with an aqueous alkali and a water-soluble reducing agent. This treatment not only removes impurities such as sulfur and catalyst but also removes the objectionable color so that the final product is a light yellowish-green colored material reasonably stable on long exposure to light. In addition, the phenothiazine purified in this manner is of sufficient purity to be used directly as an anthelmintic agent.

In contrast to the highly involved and complicated methods of the prior art, this method is extremely simple and effective. There is no susbtantial loss due to crystallization or vacuum distillation. Crystallization from solvents gives poor yields and the cost is increased further by solvent recovery losses. Vacuum distillation is attended by numerous operating difficulties, chief of which is the tendency for the phenothiazine to sublime and block the vapor lines. The high melting point of the material necessitates heating the product, lines, and receiver to a temperature of about 200° C.

To facilitate the penetration of the reducing agent, any surface-active agent effective in alkaline solution may also be employed, if desired. A convenient description of such surface-active agents is given in the Bulletin of the National Formulary Committee, vol. X, Nos. 8-9; 1942. Published by American Pharmaceutical Association, Washington, D. C. See also book "Surface Active Agents" by Young and Coons, published in 1945 by Chemical Publishing Co., Brooklyn, N. Y. They include the soaps, proteins, alkali-metal alcohol sulfates, the alkali-metal sulfonates, etc.

In the process of this invention, the crude molten phenothiazine is run into a tank of well agitated water, whereupon the crude phenothiazine is congealed into small brittle pieces which can be fed to a pulverizing mill. The disintegrated phenothiazine is wet ground in a pulverizing mill with a dilute aqueous solution of an alkali; a water-soluble reducing agent and/or a small amount of a surface-active agent may also be added at this stage, or later. The wet grinding gives a phenothiazine slurry which is very readily handled and which further eliminates the hazard of dermatitis as well as retarding the oxidation which normally occurs with dry, finely divided phenothiazine. After being treated with the aqueous alkaline solution and reducing agent, the phenothiazine is filtered, washed and dried, and is obtained as a fine powder, yellow to yellow-green in color, melting at between 181° C. and 185° C. The yield is excellent, being nearly quantitative.

In the event that any unreacted diphenylamine is present in the crude phenothiazine it may be removed by a steam distillation. This treatment removes diphenylamine without substantial volatilization of phenothiazine. The treatment with alkali and a small portion of the reducing agent is preferably made prior to the distillation, and the balance of the reducing agent is added afterwards.

Suitable alkaline materials are sodium hydroxide, potassium hydroxide, sodium carbonate, potassium carbonate, ammonium hydroxide, trimethyl benzyl ammonium hydroxide, trisodium phosphate, etc. Generally, they may be used in approximately 5 to 40 per cent of the weight of the crude phenothiazine. Suitable reducing agents effective in alkaline solution are sodium sulfite, potassium sulfite, ammonium sulfite, sodium hydrosulfite, and sodium hydrosulfide, They may be used in a concentration of 0.1 to about 10 per cent of the weight of the crude phenothiazine.

The following examples are given to illustrate the invention, the parts being by weight:

*Example 1*

338 parts of diphenylamine and 128 parts of sulfur are reacted in an agitated vessel, with 1.5 parts of iodine, at a temperature of 180° C. for an hour, or until hydrogen sulfide is no longer evolved. At the completion of the reaction, the molten phenothiazine, at a temperature of 180–200° C., is run slowly into water, with very good agitation. The grey, coarse particles obtained have a melting point of 172 to 177° C., and are generally 1/8 inch or less in diameter.

The damp particles are fed into a pulverizer, along with a solution containing about 2% of sodium hydroxide and about 0.25% of a surface-active agent, such as one having the formula

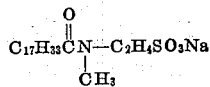

$$C_{17}H_{33}\overset{O}{\overset{\|}{C}}\underset{\underset{CH_3}{|}}{N}-C_2H_4SO_3Na$$

at such a rate that about 2 to 3 pounds of solution are employed for each pound of phenothiazine. The phenothiazine is pulverized so that a majority of the particles pass through a 200 mesh screen.

The resulting slurry is now transferred to a vessel equipped with a good agitator and a source of heat. Water and sodium hydroxide are added to make up the mixture to a concentration of about 5% sodium hydroxide, and about 20% of phenothiazine. The mixture is heated to 50–100° C., with agitation, for about an hour. Steam is then introduced below the surface of the mixture, and steam distillation is continued for 3 to 4 hours, thus removing traces of diphenylamine and other impurities.

Following this, the still hot mixture is treated with a small amount of an inorganic reducing agent, for example: 1 part of sodium hydrosulfite per 100 parts of phenothiazine. The mixture is then cooled somewhat, for convenient handling, and filtered. The filter cake is washed with water to remove soluble salts and dried at 80–90° C.

The product is yellow to yellow-green in color melting between 181 and 185° C. A yield of 98% of theory is obtained, based on the weight of diphenylamine used.

*Example 2*

338 parts of diphenylamine and 129.3 parts of sulfur (an excess of about 1% over the stoichiometric amount of sulfur) are reacted in a vessel equipped with stirring, in the presence of 1.5 parts iodine, for an hour at 180° C., or until hydrogen sulfide is no longer evolved. At the completion of the reaction, the molten phenothiazine, at a temperature of 180–200° C., is run slowly into water with very good agitation. The grey coarse particles obtained have a melting point of 172–177° C. and are generally 1/8 inch or less in diameter.

The damp particles are fed into a pulverizer along with a solution containing 2% sodium hydroxide and 0.25% of the same wetting agent mentioned in Example 1 at such a rate that about 2 to 3 pounds of solution are employed for each pound of phenothiazine. The phenothiazine is pulverized so that a majority of the particles pass through a 200 mesh screen.

The resulting slurry is now transferred to a vessel equipped with a good agitator and a source of heat. Water, sodium hydroxide and sodium hydrosulfite are added to make up the mixture to a concentration of about 5% sodium hydroxide and about 20% phenothiazine, and 0.1 part of sodium hydrosulfite per 100 parts of phenothiazine. The mixture is heated at 50–100° C. with agitation for an hour, and there are then added 0.9 part of sodium hydrosulfite per 100 parts of phenothiazine. After cooling and filtering, the material is washed with water until free of soluble salts, and finally dried. The product is a yellowish to yellow-green powder melting between 181 and 185° C. A yield of 98% thiodiphenylamine based on the diphenylamine used is obtained.

A preferred procedure of our invention may be outlined as follows:
1. Wet-grind with solution of alkali, and wetting agent, if desired.
2. Add additional alkali to slurry.
3. Add a small portion of the reducing agent.
4. Heat at about 95° C. for 1 hour or more.
5. Steam distill, if desired.
6. Add balance of the reducing agent.
7. Cool, if desired. (This is not essential.)
8. Filter, wash, and dry.

It is to be understood that other surface-active agents of the character described, than that given in the examples, may be used; also that the temperatures used may be varied from those given.

While we have shown and described various embodiments of the invention, it is to be understood that the invention is susceptible to those modifications which appear within the spirit of the invention and the scope of the appended claims.

Having thus described our invention, what we claim and desire to protect by Letters Patent is:

1. A method of purifying crude phenothiazine containing sulfur and an acidic catalyst as impurities which comprises agitating the crude phenothiazine in finely-divided form with a dilute aqueous solution of an alkali and a water-soluble reducing agent selected from the group consisting of alkali metal sulfites, hydrosulfites and hydrosulfides, and subsequently separating the phenothiazine from the mixture and washing the separated product to produce a product purified of said impurities and having a yellow to yellow-greenish color.

2. A method of purifying crude phenothiazine containing sulfur and an acidic catalyst as impurities which comprises agitating and heating the crude phenothiazine in finely-divided form with a dilute aqueous solution of an alkali, a water-soluble reducing agent selected from the group consisting of alkali metal sulfites, hydrosulfites and hydrosulfides, and a surface-active agent effective in alkaline solution, and subsequently separating the phenothiazine from the mixture and washing the separated product to produce a product purified of said impurities and having a yellow to yellow-greenish color.

3. A method of purifying crude phenothiazine containing sulfur and an acidic catalyst as impurities which comprises agitating and heating the crude phenothiazine in finely-divided form with a dilute aqueous solution of an alkali, an alkali metal sulfite reducing agent which is effective in alkaline solution, and a surface-active agent effective in alkaline solution, and subsequently separating the phenothiazine from the mixture and washing the separated product to produce a product purified of said impurities and having a yellow to yellow-greenish color.

4. A method of purifying crude phenothiazine containing sulfur and an acidic catalyst as impurities which comprises running the crude, molten phenothiazine into a body of well agitated water and thereby effecting congealing of the crude phenothiazine into small brittle pieces, wet grinding the crude congealed phenothiazine with an aqueous alkaline solution to form a slurry, agitating and heating the slurry with additional aqueous alkaline solution, and with a water-soluble reducing agent selected from the group consisting of alkali metal sulfites, hydrosulfites and hydrosulfides, and subsequently separating the phenothiazine from the mixture, and washing the separated product to produce a purified phenothiazine.

5. A method of purifying crude phenothiazine containing sulfur and an acidic catalyst as impurities which comprises running the crude, molten phenothiazine into a body of well agitated water and thereby effecting congealing of the crude phenothiazine into small brittle pieces, wet grinding the crude congealed phenothiazine with an aqueous alkaline solution to form a slurry, agitating and heating the slurry with additional aqueous alkaline solution, and with a water-soluble reducing agent selected from the group consisting of alkali metal sulfites, hydrosulfites and hydrosulfides, in the presence of a surface-active agent effective in alkaline solution, and subsequently separating the phenothiazine from the mixture, and washing the separated product to produce a purified phenothiazine.

CHARLES W. GATES.
CECIL R. HOWEY.

No references cited.